(12) United States Patent
Chang

(10) Patent No.: US 9,089,212 B2
(45) Date of Patent: Jul. 28, 2015

(54) ASSEMBLED STRUCTURE WITH CONNECTORS

(76) Inventor: Wen-Tsung Chang, Taichung (TW)

( * ) Notice: Subject to any disclaimer, the term of this patent is extended or adjusted under 35 U.S.C. 154(b) by 88 days.

(21) Appl. No.: 13/445,774

(22) Filed: Apr. 12, 2012

(65) Prior Publication Data

US 2012/0294675 A1    Nov. 22, 2012

(30) Foreign Application Priority Data

May 18, 2011  (CN) .......................... 2011 1 0133056

(51) Int. Cl.
*F16B 5/06* (2006.01)
*A47B 47/00* (2006.01)
*F16B 5/00* (2006.01)
*F16B 1/00* (2006.01)

(52) U.S. Cl.
CPC ........... *A47B 47/0016* (2013.01); *F16B 5/0028* (2013.01); *F16B 2001/0035* (2013.01); *Y10T 403/341* (2015.01); *Y10T 403/347* (2015.01); *Y10T 403/443* (2015.01); *Y10T 403/7016* (2015.01)

(58) Field of Classification Search
CPC ........ F16B 5/0028; F16B 5/06; F16B 5/0607; F16B 5/0614; A47B 47/0016
USPC .......... 160/52; 135/120.3, 909; 403/169, 170, 403/173, 218, 294, 64, 175, 176, 174, 219; 52/81.3, 109
See application file for complete search history.

(56) References Cited

U.S. PATENT DOCUMENTS

| | | | | |
|---|---|---|---|---|
| 3,362,739 A * | 1/1968 | Staeger et al. | ............... | 52/285.1 |
| 3,715,136 A * | 2/1973 | Yoshida | ...................... | 52/285.2 |
| 4,470,647 A * | 9/1984 | Bishoff et al. | ................ | 312/111 |
| 4,515,280 A * | 5/1985 | Sheu | ............................. | 211/189 |
| 4,793,725 A * | 12/1988 | Cheng | .......................... | 403/174 |
| 6,296,415 B1 * | 10/2001 | Johnson et al. | ............... | 403/170 |
| 7,841,572 B2 * | 11/2010 | Chen et al. | ................... | 248/317 |
| 2002/0166304 A1 * | 11/2002 | Pareti | .......................... | 52/655.2 |
| 2004/0131416 A1 * | 7/2004 | Wu et al. | ....................... | 403/170 |
| 2009/0020669 A1 * | 1/2009 | Wang | .......................... | 248/220.1 |
| 2009/0166356 A1 * | 7/2009 | Tsai | ............................. | 220/4.01 |
| 2012/0000059 A1 * | 1/2012 | Fox et al. | ................... | 29/525.01 |

* cited by examiner

*Primary Examiner* — Daniel P Stodola
*Assistant Examiner* — Matthew R McMahon
(74) *Attorney, Agent, or Firm* — Che-Yang Chen; Law Office of Michael Chen

(57) ABSTRACT

An assembled structure with connectors may include a first unit and a second unit. One side of the first unit extends to protrudingly form a plurality of protruding ribs that define a plurality of horizontal and vertical long connecting slots, and the first unit and second unit engage with each other. Also, a plurality of engaging slots are formed between the first unit and second unit, and the other side of the second unit has elongated slots. Thus, a board is connected with the connector at four corners of the board, and the first unit has long connecting slots that are used to circularly form a square frame. A backboard is connected with the engaging slot and the board to form a usable assembled structure.

8 Claims, 17 Drawing Sheets

ASSEMBLED STRUCTURE WITH CONNECTORS

FIELD OF THE INVENTION

The present invention relates to an assembled structure, and more particularly to a connector used for an assembled structure formed by the connectors to increase variety and practicability of the assembled structure.

BACKGROUND OF THE INVENTION

A conventional assembled structure, as shown in FIG. 17, includes a connecting body (40), and a plurality of L-shaped protruding ribs extends from one side of the connecting body (40), and defines vertical and horizontal openings (41). The rear end of the connecting body (40) has a plurality of connecting slots (42), and the openings (41) and the connecting slots are provided to connect boards, such that an assembled structure can be formed by a plurality of connecting bodies (40) and boards. It is disadvantageous that the connecting body (40) is formed as one piece, and the variations between the connecting body (40) and the boards are limited. The configuration of the assembled structure cannot be changed, and the variety and practicability of the structure is reduced.

SUMMARY OF THE INVENTION

Conventionally, the connecting body is formed as one piece, and the variations between the connecting body and the boards are limited. The configuration of the assembled structure cannot be changed, and the variety and practicability of the structure is reduced.

To solve and overcome the problems stated above, an assembled structure includes a connector having a first unit and a second unit, and one side of the first unit extends to protrudingly form a plurality of protruding ribs that define a plurality of horizontal and vertical long connecting slots. A plurality of second protruding ribs are protrudingly formed on the other side of the first unit, and a connecting portion with appropriate thickness is protrudingly formed corresponding to the shape of the long connecting slot. One side of the surface of the second unit has an engaging portion corresponding to the first unit with appropriate thickness to engage with the connecting portion of the first unit. A plurality of engaging slots are formed between the first unit and the second unit, and a plurality of rib units extends from the other side of the second unit, and the rib unit defines a plurality of elongated slots with vertical and horizontal directions to form a usable assembled structure.

Comparing with the conventional arts, the present invention is advantageous because the connector is formed by the first unit and second unit, and one side thereof is provided for board to connect the long connecting slots and define the engaging slot. The second unit has varieties so that the configuration of the assembled structure can be changed to increase the variety and practicability.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
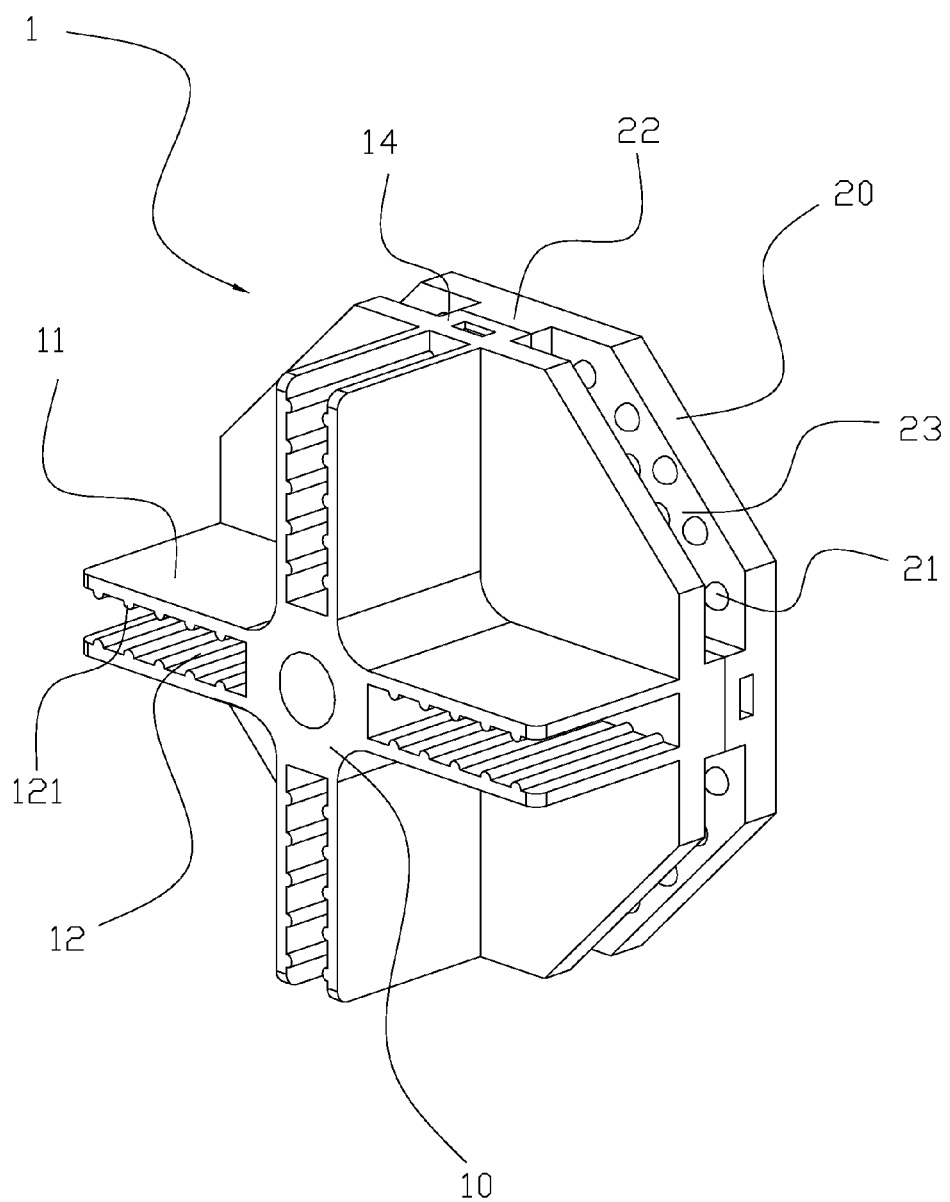
FIG. 1 illustrates a three-dimensional view in the present invention.
Figure 2:
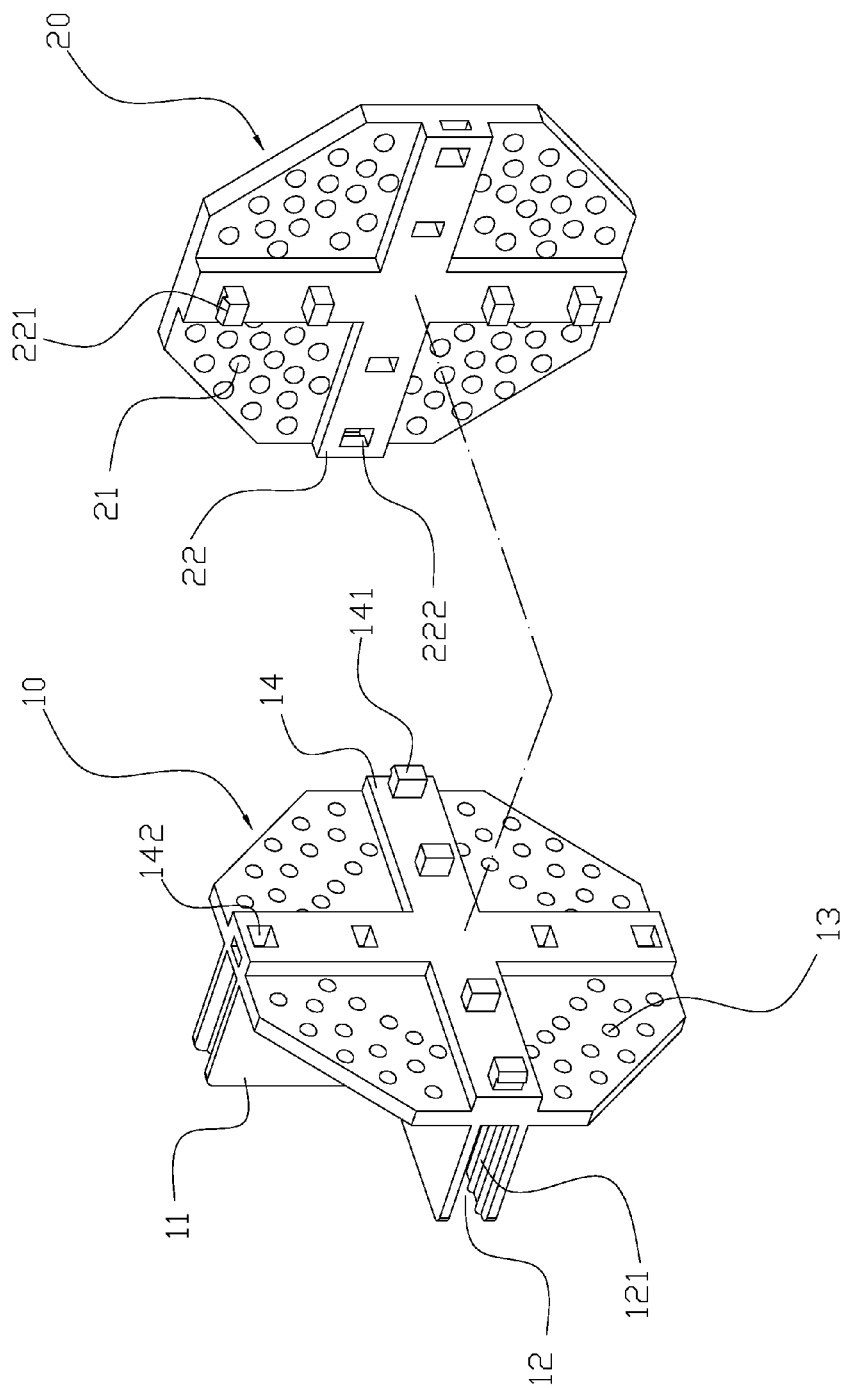
FIG. 2 illustrates a three-dimensional exploded view in the present invention.

In order to further understand the goal, characteristics and effect of the present invention, a number of embodiments along with the drawings are illustrated as following:

Referring to FIGS. 1 to 2, an assembled structure includes a connector (1) having a first unit (10) and a second unit (20), and one side of the first unit (10) extends to protrudingly form a plurality of protruding ribs (11) that define a plurality of horizontal and vertical long connecting slots (12), and a plurality of engaging ribs (121) are formed at an inner portion of the protruding rib (11) to engage with the long connecting slot (12). A plurality of second protruding ribs (13) are protrudingly formed on the other side of the first unit (10), and a connecting portion (14) with appropriate thickness is protrudingly formed corresponding to the shape of the long connecting slot (12), and the connecting portion (14) has a connecting block (141) and a connecting hole (142), as well as magnets. One side of the lateral surface of the second unit (20) has a plurality of engaging points (21) and an engaging portion (22) corresponding to the first unit (10) with appropriate thickness. The engaging portion of the second unit (20) has an engaging block (221) and an engaging hole (222), as well as magnets.

Figure 3:
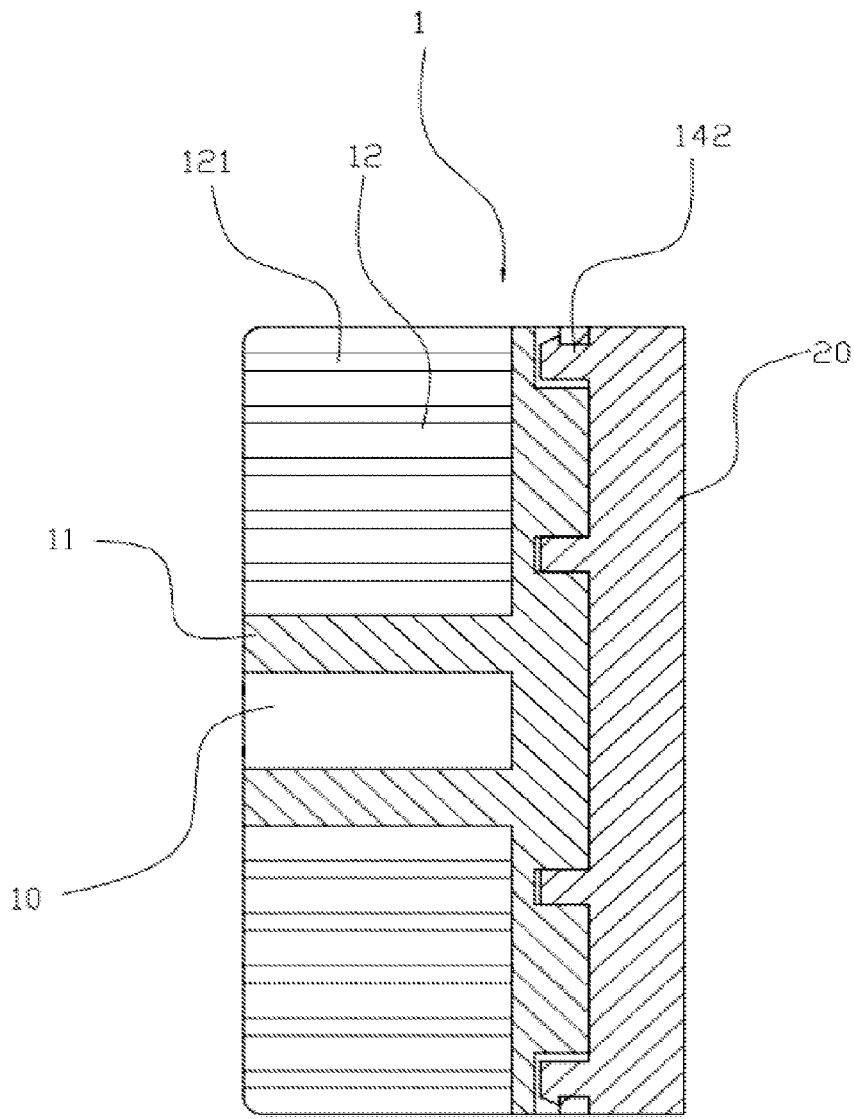
FIG. 3 illustrates a sectional schematic view in the present invention.
Figure 4:
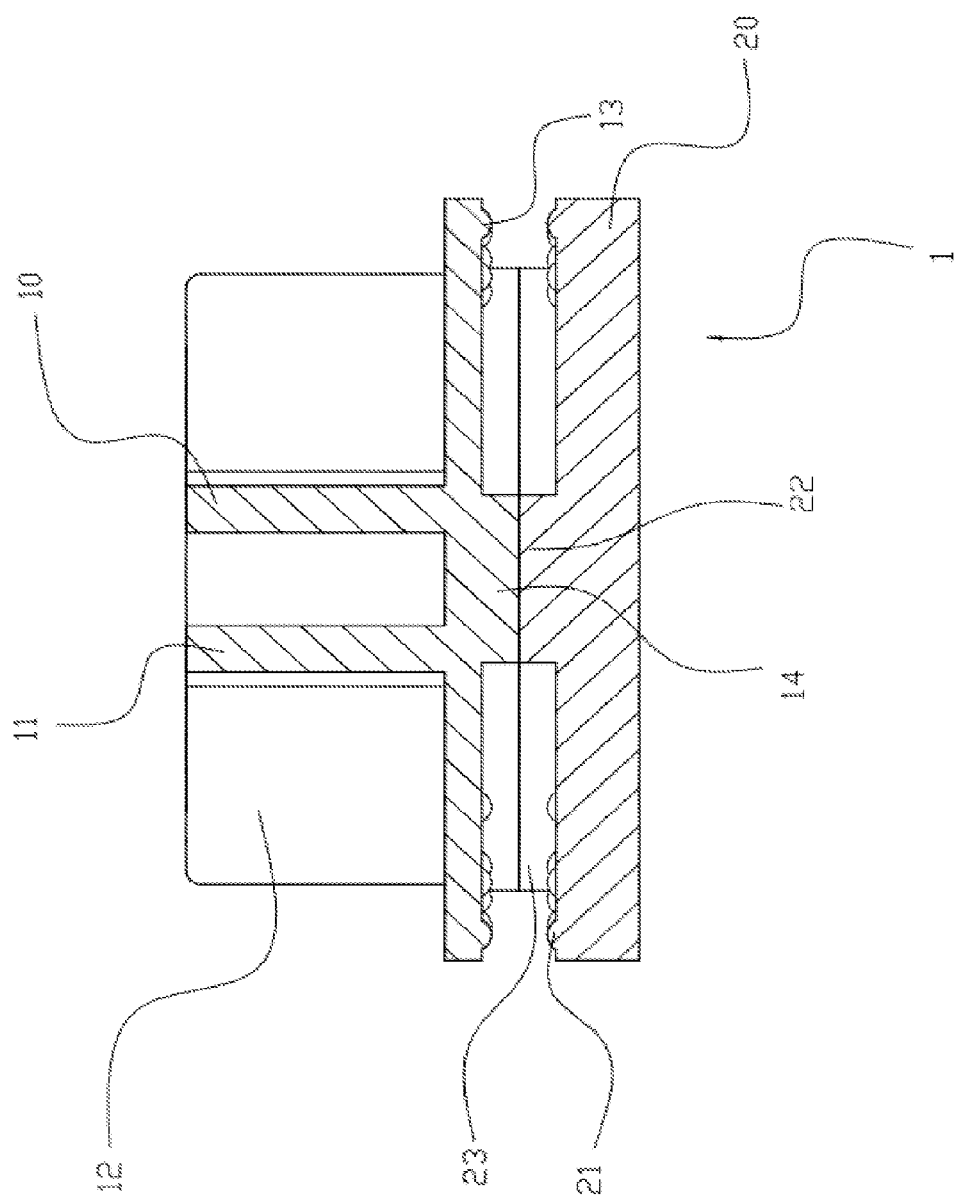
FIG. 4 illustrates a sectional schematic view from another angle in the present invention.

Referring to FIGS. 2, 3 and 4 for the structure of the present invention, the first unit (10) and second unit (20) can be engaged with each other through the connecting portion (14) and the engaging portion (22), or the engagement of the connecting hole and the engaging block (221) and engaging hole (222). Also, the first unit (10) and second unit (20) can be engaged with each other through magnetic force, so as to apply to the connector (1) of the assembled structure. To integrate the connector (1) with the first unit (10) and second unit (20), the connecting portion (14) and the engaging portion (22) engage with each other to form an engaging slot (23), and the assembled structure with connectors is thus formed.

Figure 5:
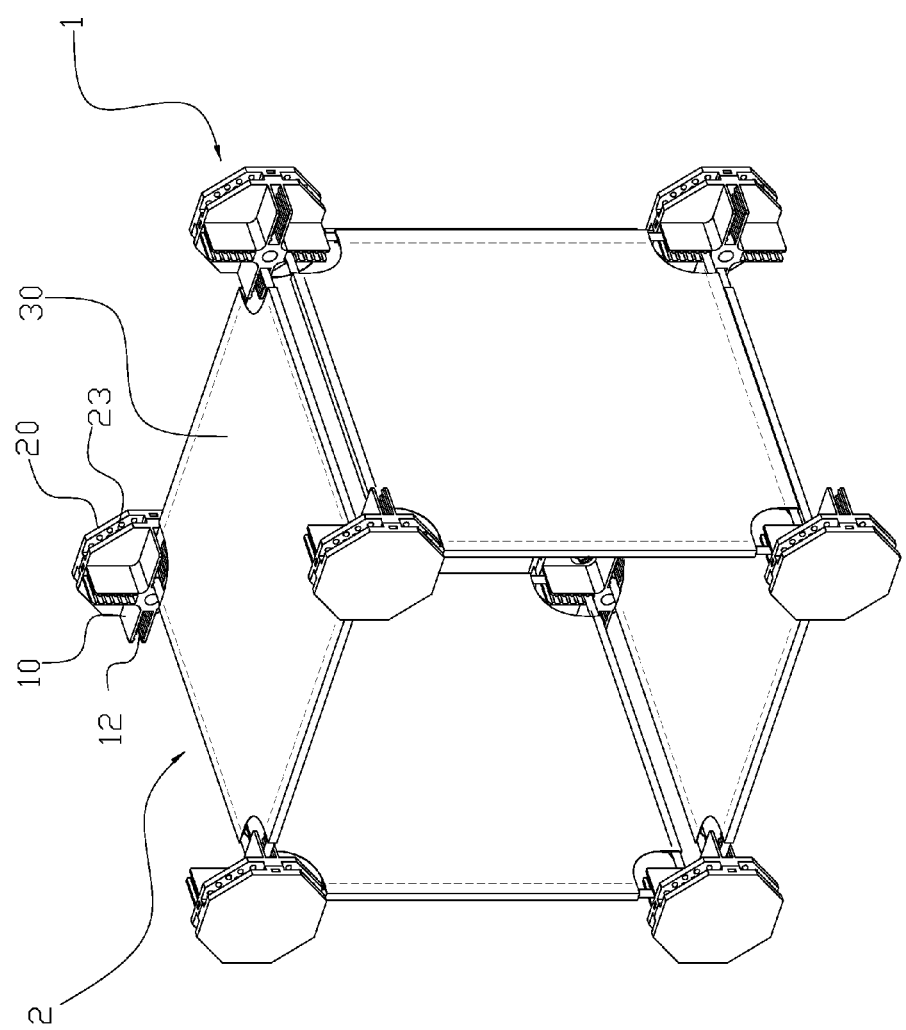
FIG. 5 illustrates a schematic view of the usage of the present invention.

Referring to FIG. 5 for the usage of the structure in the present invention, the connectors (1) and a plurality of boards (30) to form an assembled structure (2), wherein the board (30) is connected with the connector (1) at four corners of the board (30), and the first unit (10) has horizontal and vertical long connecting slots (12) that are used to circularly form a square frame. A backboard is connected with the engaging slot (23) and the board (30) to form a usable assembled structure.

Figure 6:
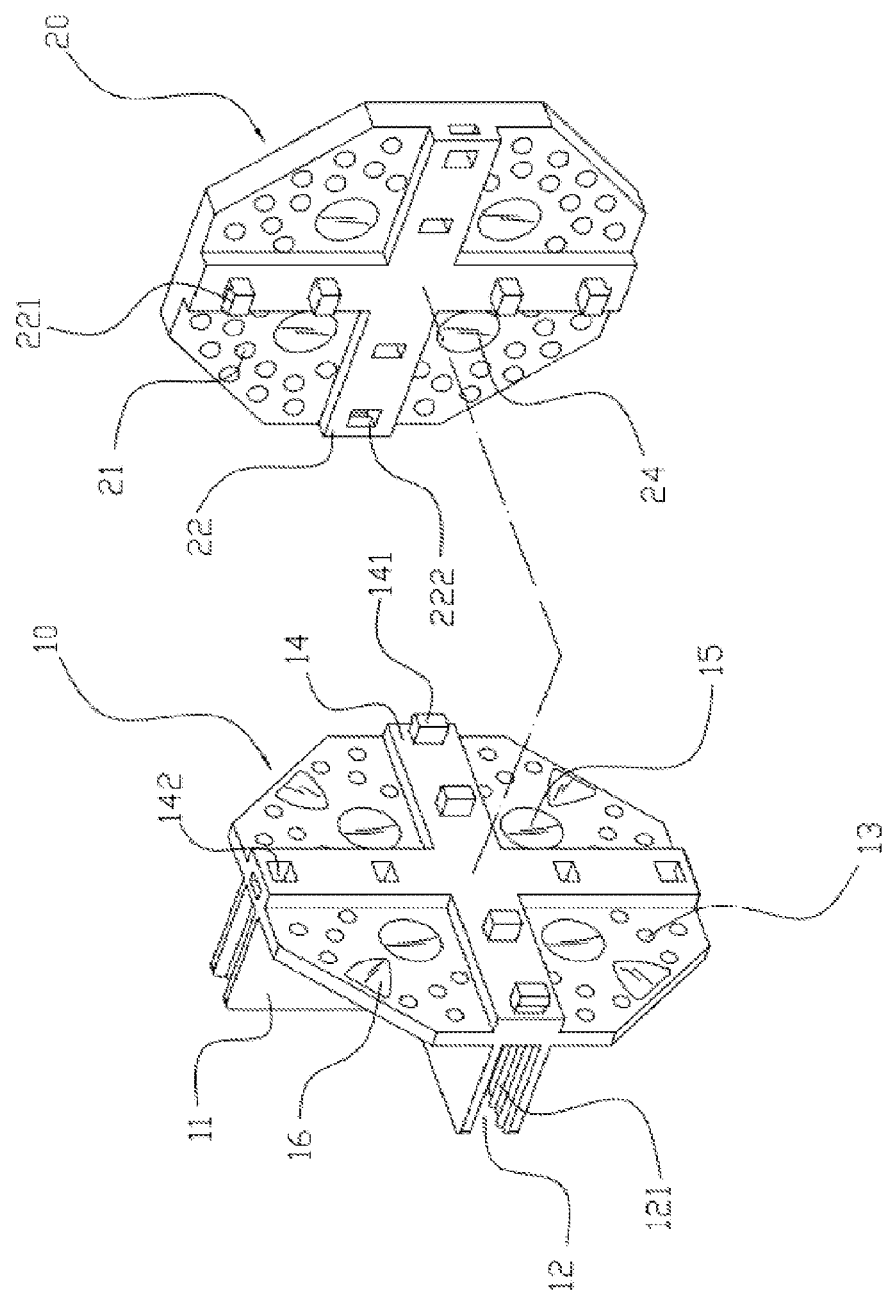
FIG. 6 illustrates another embodiment in the present invention.
Figure 7:
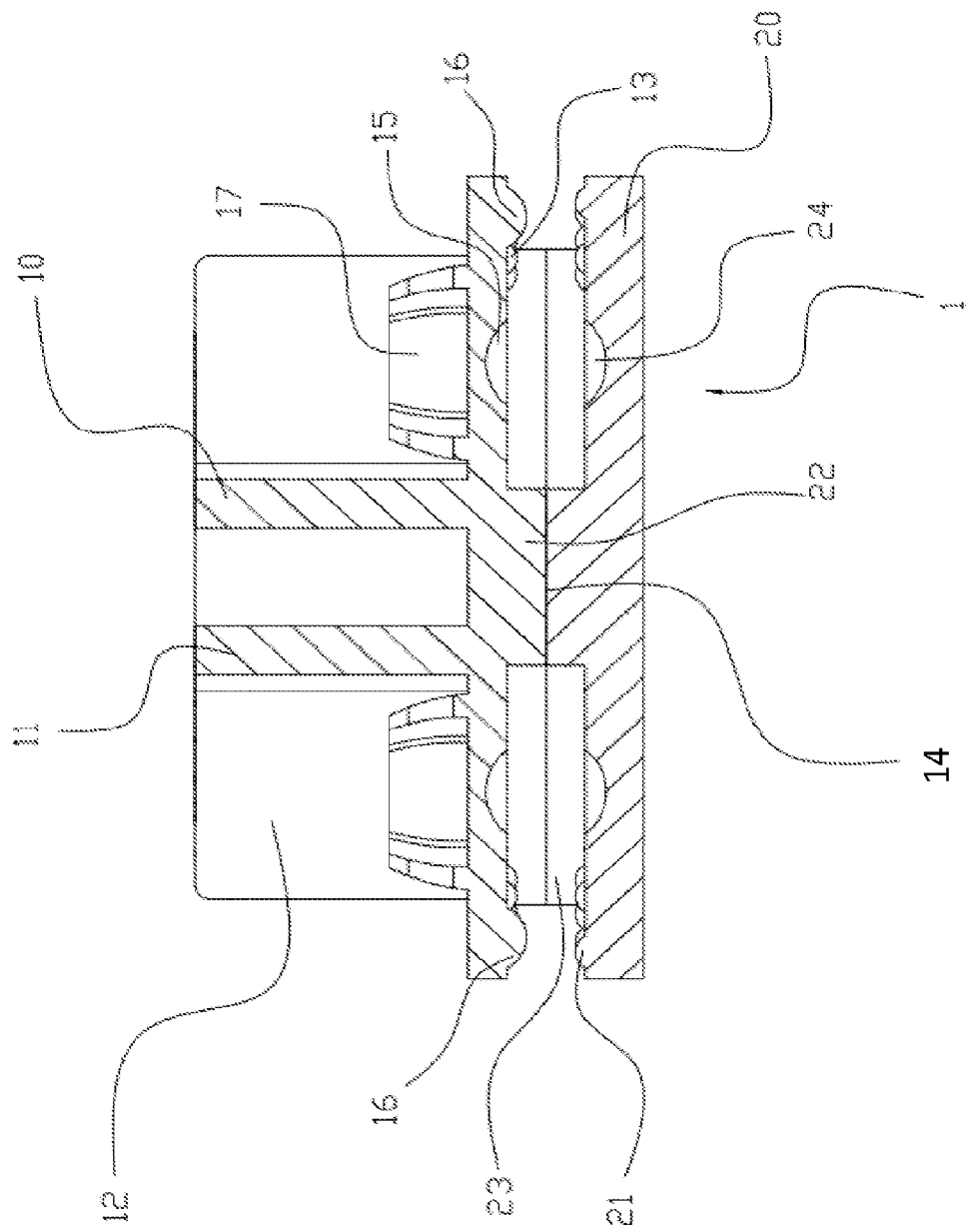
FIG. 7 illustrates a sectional view of another embodiment in the present invention.
Figure 8:
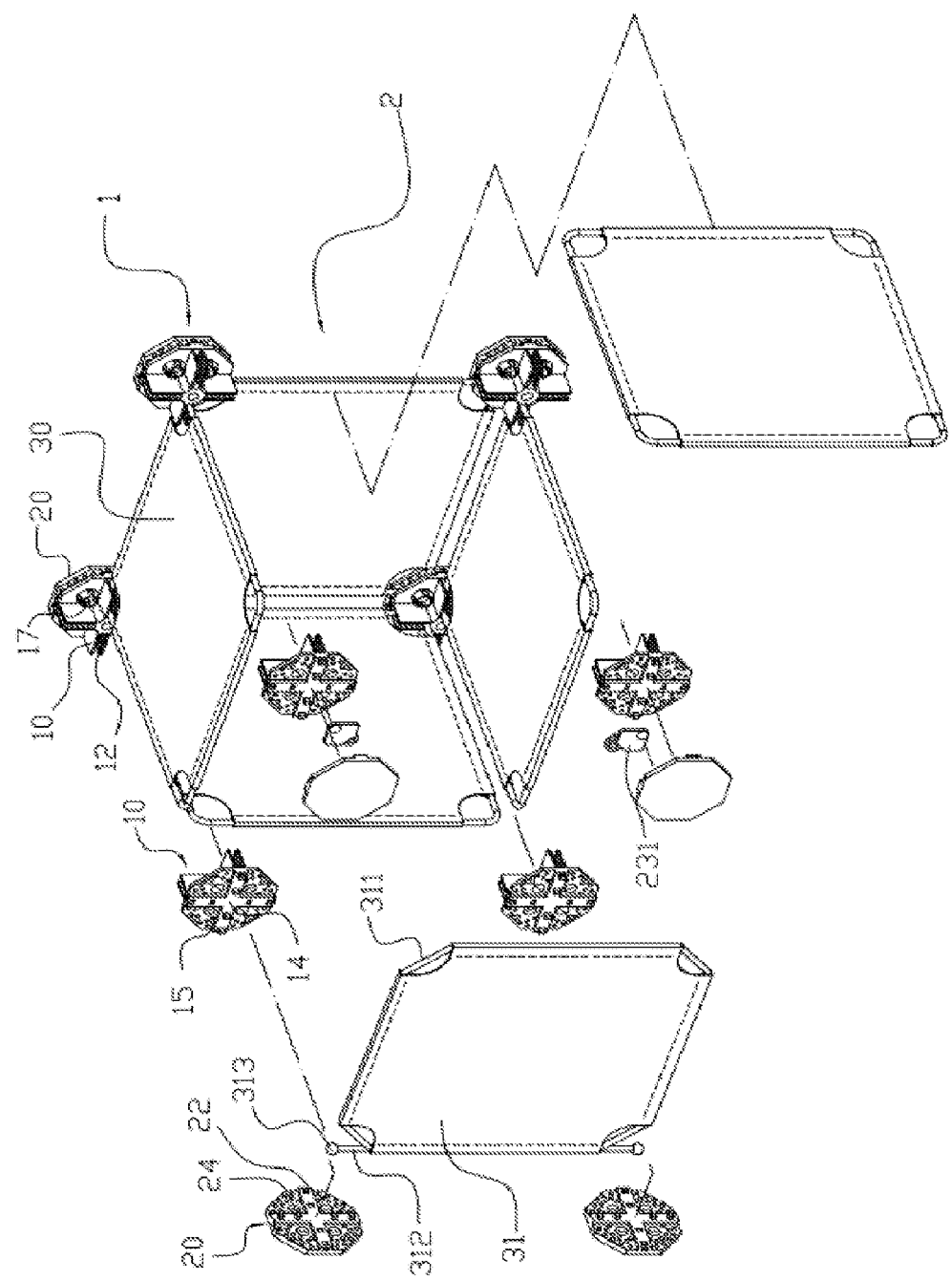
FIG. 8 illustrates an exploded view of another embodiment in the present invention.
Figure 9:
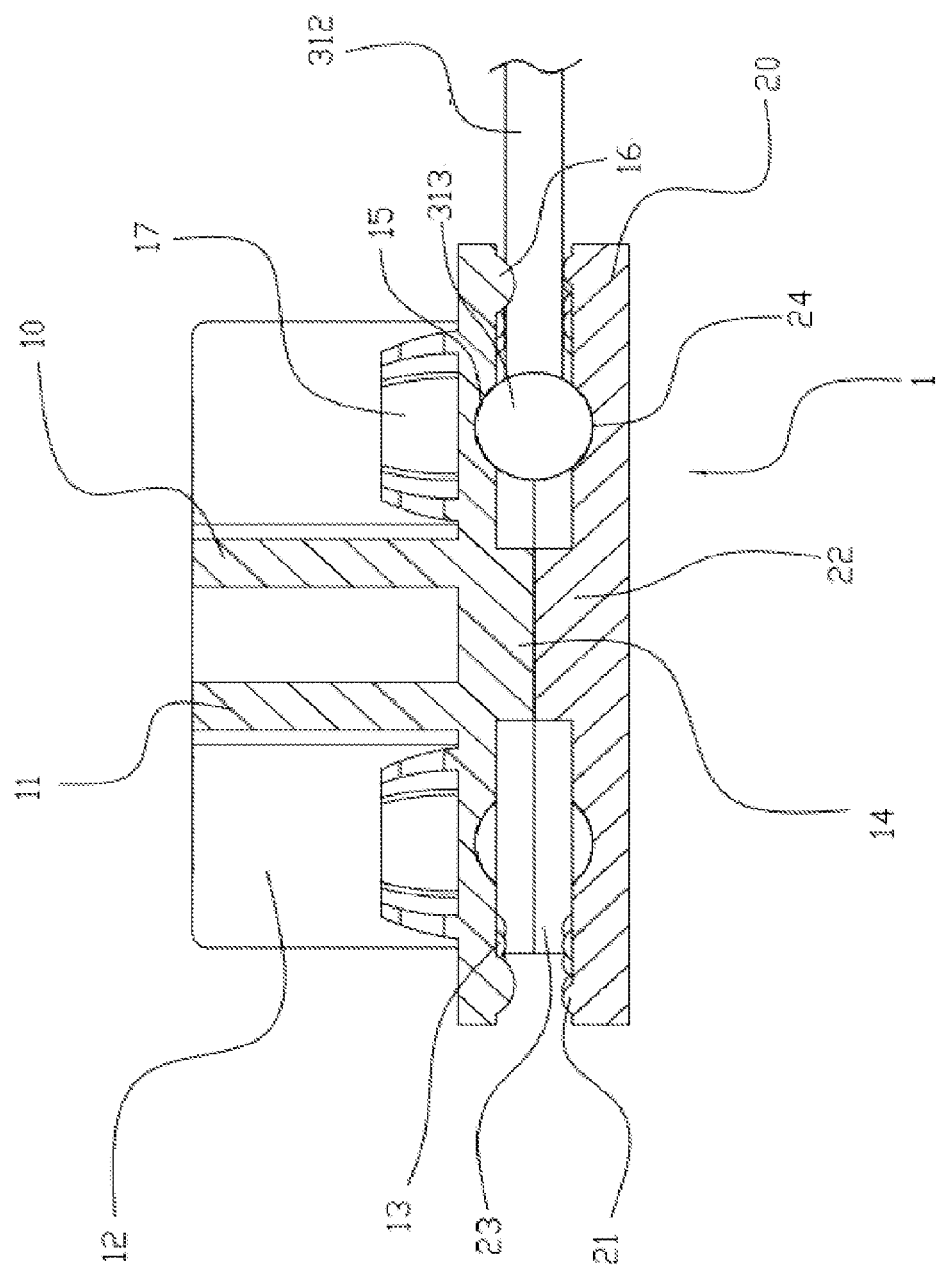
FIG. 9 illustrated a sectional view of another embodiment when in use in the present invention.
Figure 10:
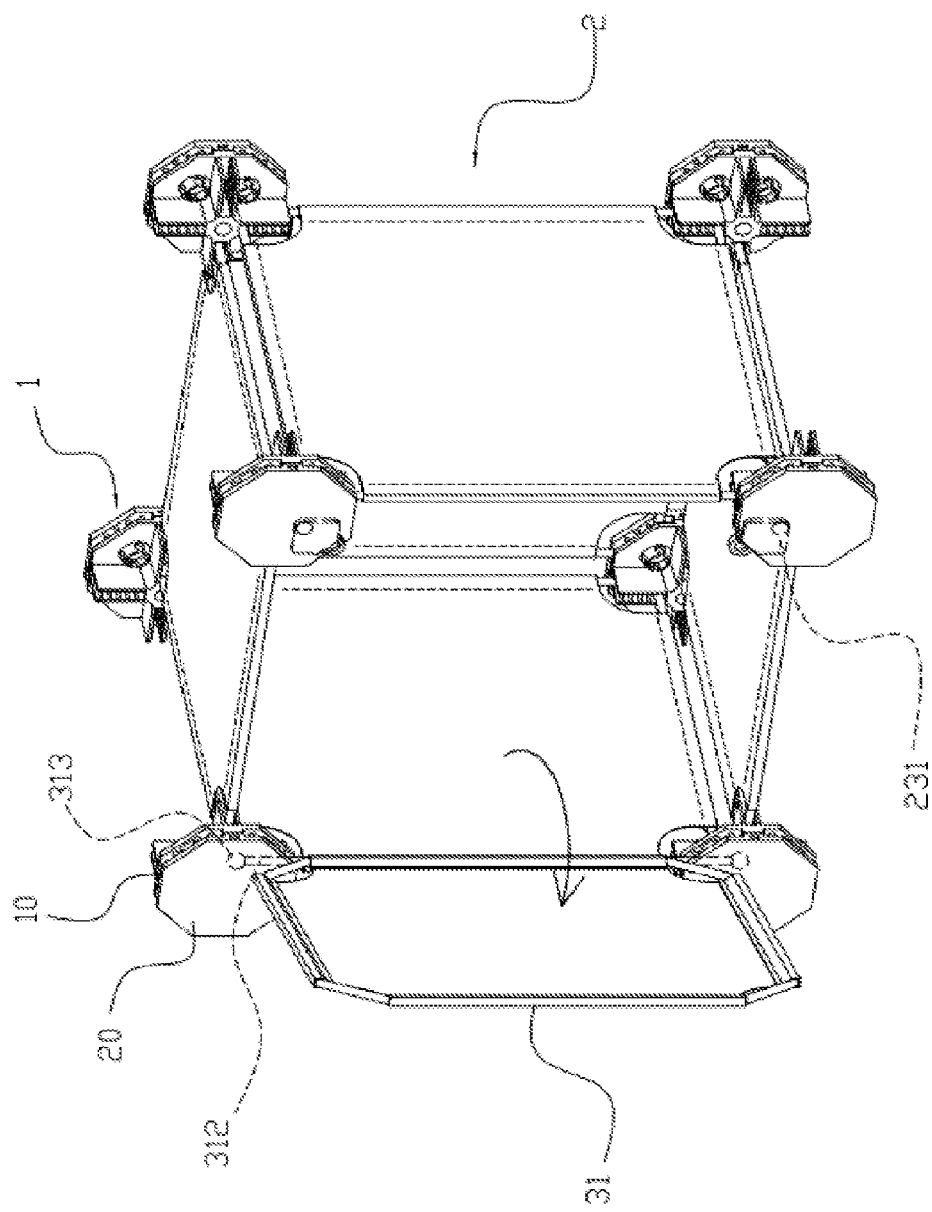
FIG. 10 illustrated a schematic view of another embodiment when in use in the present invention.

Referring to FIGS. 6 and 7, a first engaging trough (15) is recessedly formed near the connecting portion (14) of the first unit (10), and a second engaging trough (24) is formed near the engaging portion (22) of the second unit (20). A protruding restriction arc (16) formed near the first engaging trough (15) of the first unit (10) is provided for the board (30) to engage with to further increase the structure strength of the assembled structure (2), and a door (31) is provided at the engaging slot (23) between the first unit (10) and the second unit (20). Four corners of the door (31) form an evading ends (311), and a connecting rod (312) extends from the same side and a head end (313) is attached to the connecting rod (312). When the first unit (10) and the second unit (20) of the connector (1) connect with the board (30) to form the assembled structure (2), the connector (1) at an opening of the assembled structure can set up another door (31), so that the connecting rod (312) extends to the same side of the door (31) and inserts into the engaging slot (23) (as shown in FIG. 9). The head end (313) is further secured between the first engaging trough (15) and a second engaging trough (24), so that the door (31) forms a door body through the connecting stick (312) as an axis at the opening (as shown in FIG. 10). Also, a positioning unit (231) is formed at the other side of the engaging slot (23) of the assembled structure (2), so when the door (31) is closed at the opening of the assembled structure (2), it reaches a closed and secured position.

Figure 11:
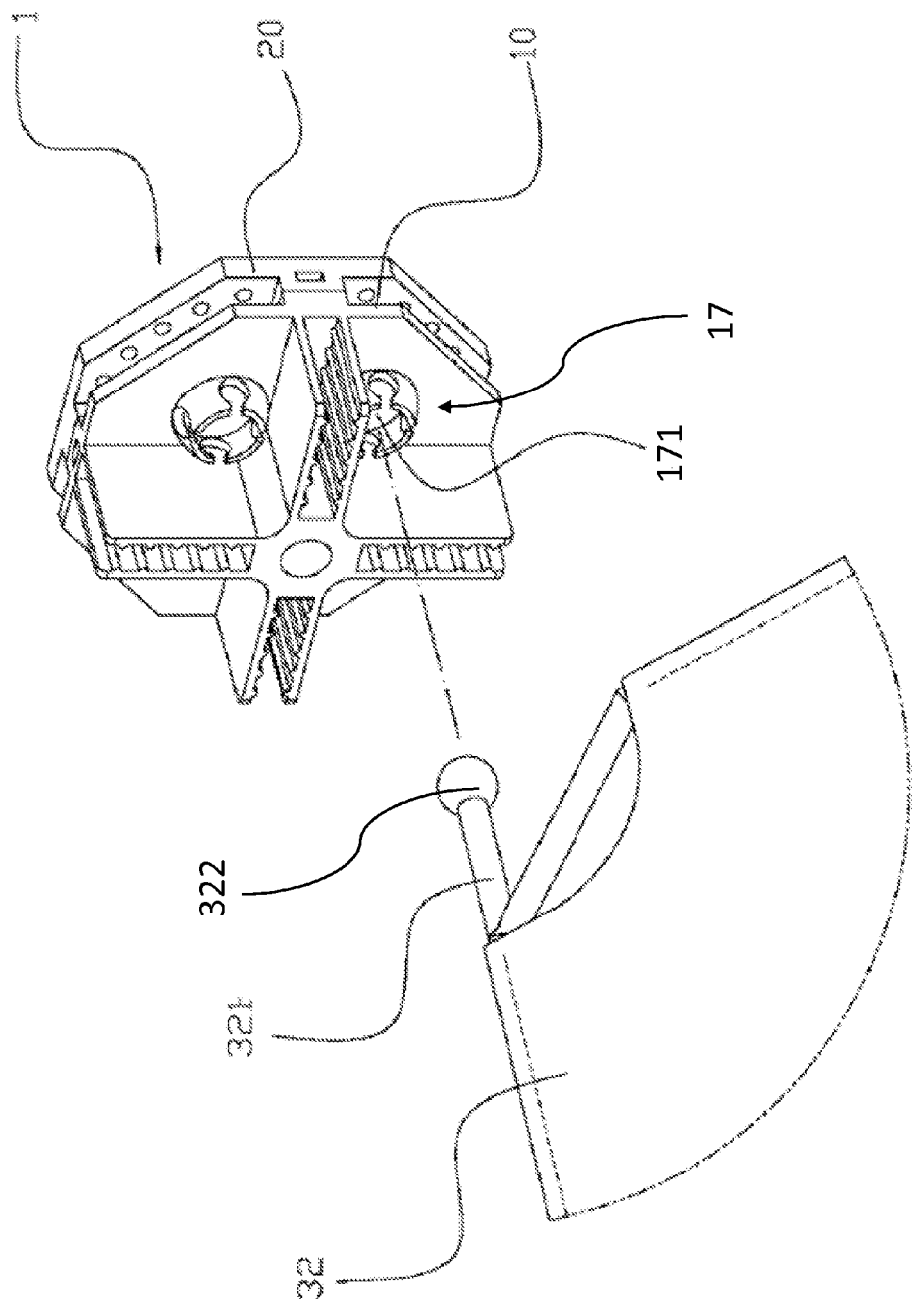
FIG. 11 illustrated another schematic view of another embodiment when in use in the present invention.
Figure 12:
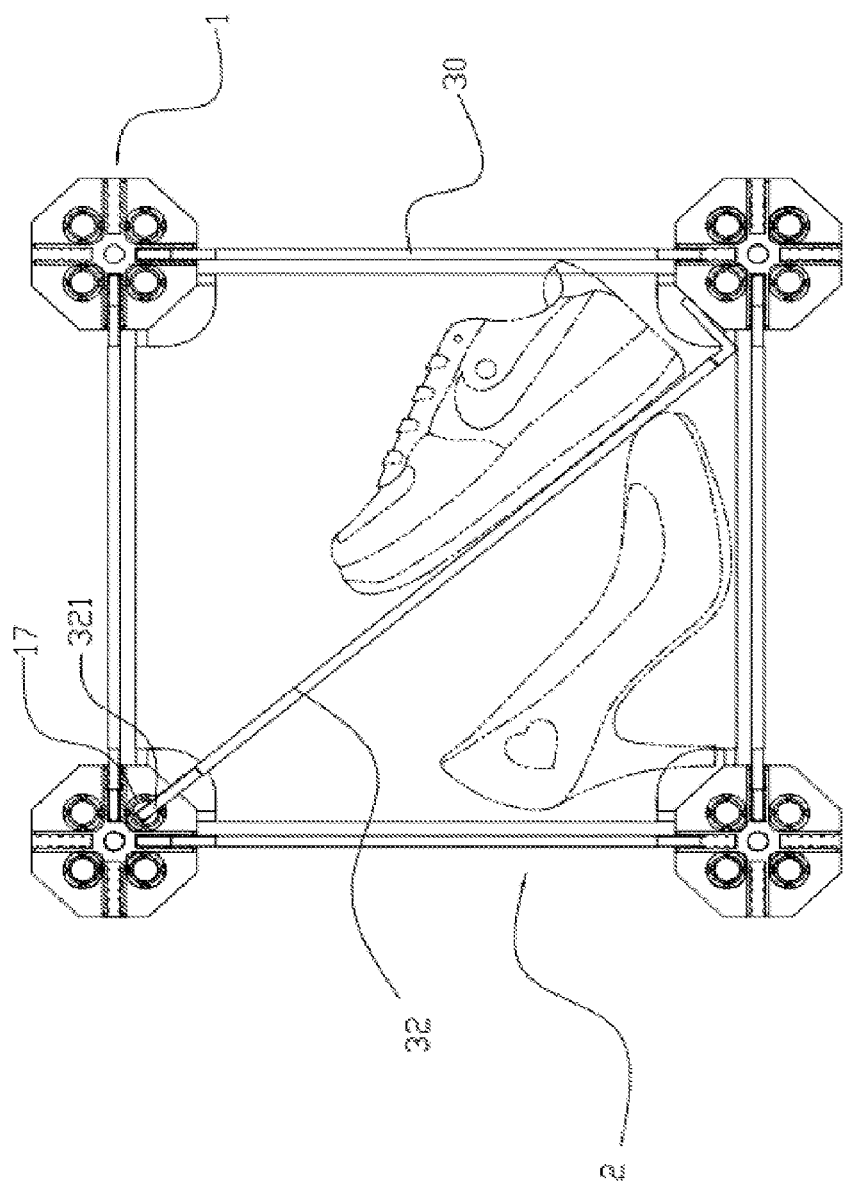
FIG. 12 illustrated a further schematic view of another embodiment when in use in the present invention.

As can be seen in FIGS. 11 and 12, the first unit (10) of the connector (1) forms a plurality of conjugating slots (17) having a semi ball-shaped receiving space (171), and when the connector (1), the first unit (10), the second unit (20) and the board (30) are connected to form an assembled structure (2), a slanted board (32) can be disposed therein. The connecting sticks (321) that each have a ball-shaped connecting unit (322) at one end extend from four corners of the slanted board (32), and when it is disposed in the assembled structure (2), the ball-shaped connecting unit (322) of the connecting stick (321) is received by the semi ball-shaped receiving space (171) to form a secured positioning with the conjugating slot (17) of the first unit (10), and the space inside the assembled structure (2) is divided into two symmetric spaces, which can be used to receive shoes and other purposes to increase the varieties of using the space.

Figure 13:
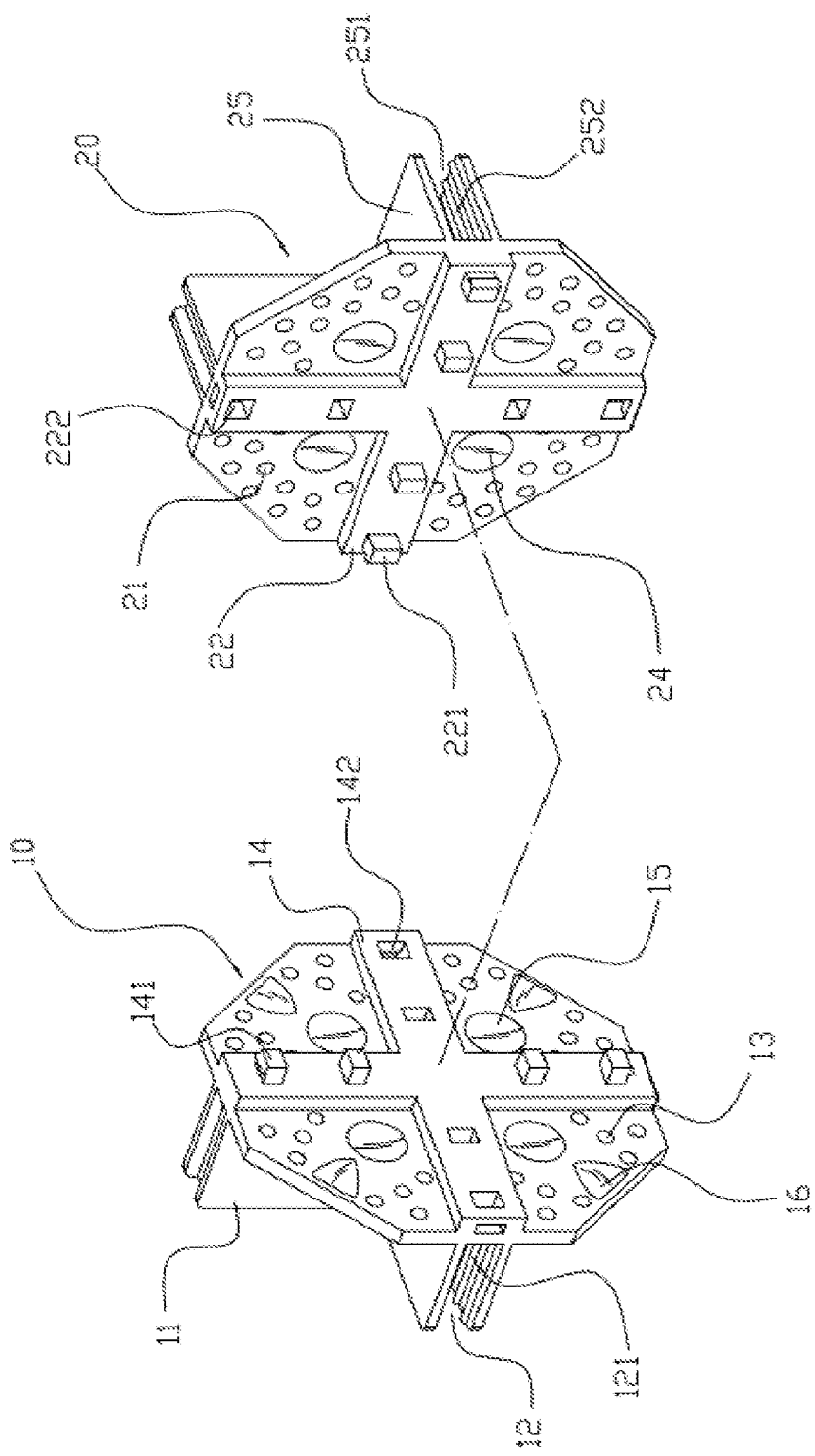
FIG. 13 illustrates a different embodiment in the present invention.
Figure 14:
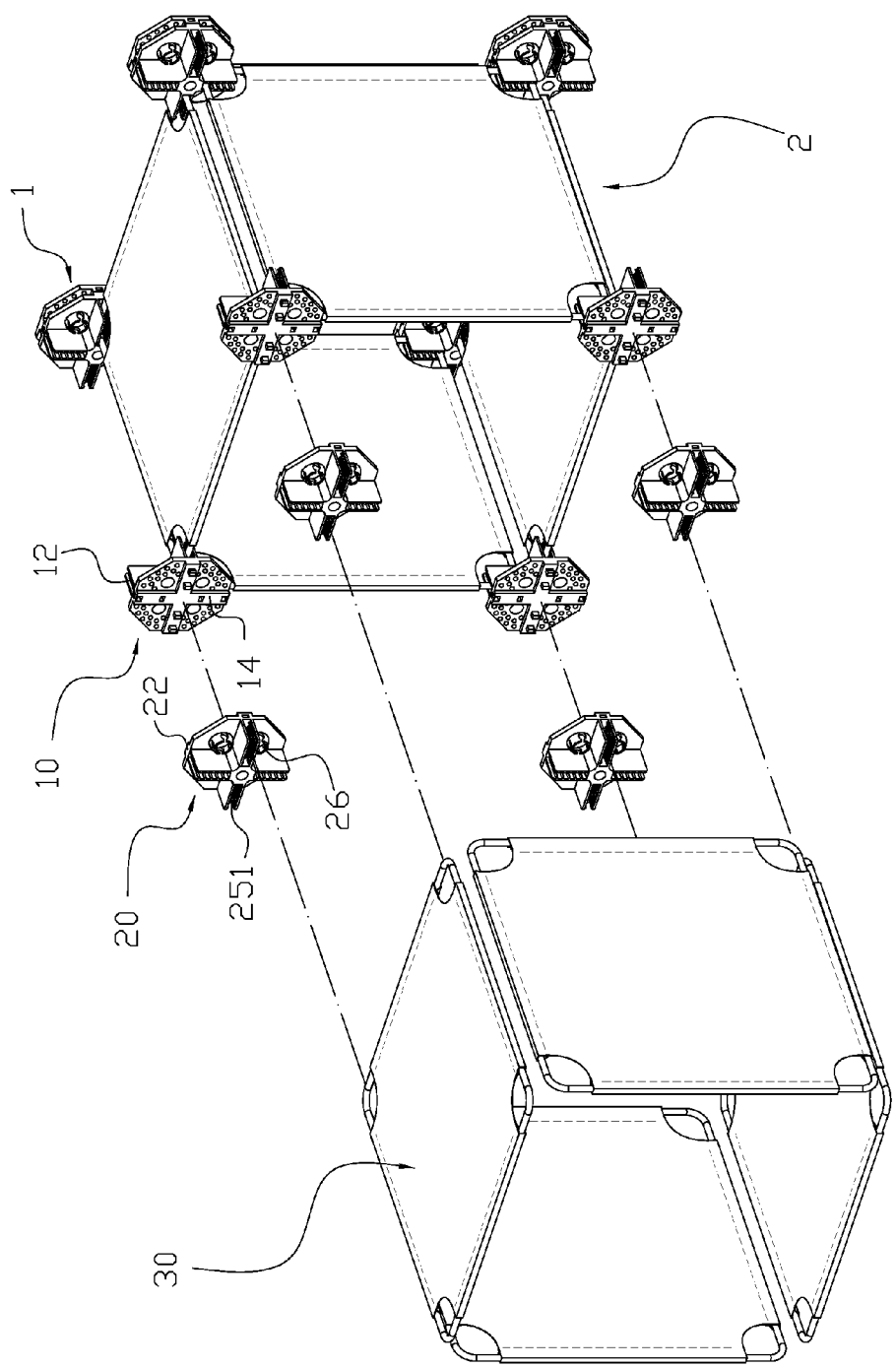
FIG. 14 illustrates an exploded view of the embodiment in FIG. 13 in the present invention.

Referring to FIGS. 13 and 14, a plurality of rib units (25) extends from the other side of the second unit (20), and the rib unit (25) defines a plurality of elongated slots (251) with vertical and horizontal directions, and reinforced ribs (252) are formed at an inner wall of the elongated slot (251). So, when the first unit (10) and second unit (20) are connected to form the connector (1), the board can horizontally extends from the engaging slot (23) to form the assembled structure (2), and the elongated slots (251) of the second unit (20) can secure the board (30). Namely, the assembled structure (2) can be extended vertically to form receiving spaces, and the second unit (20) has an engaging trough (26) near the rib unit (25).

Figure 15:
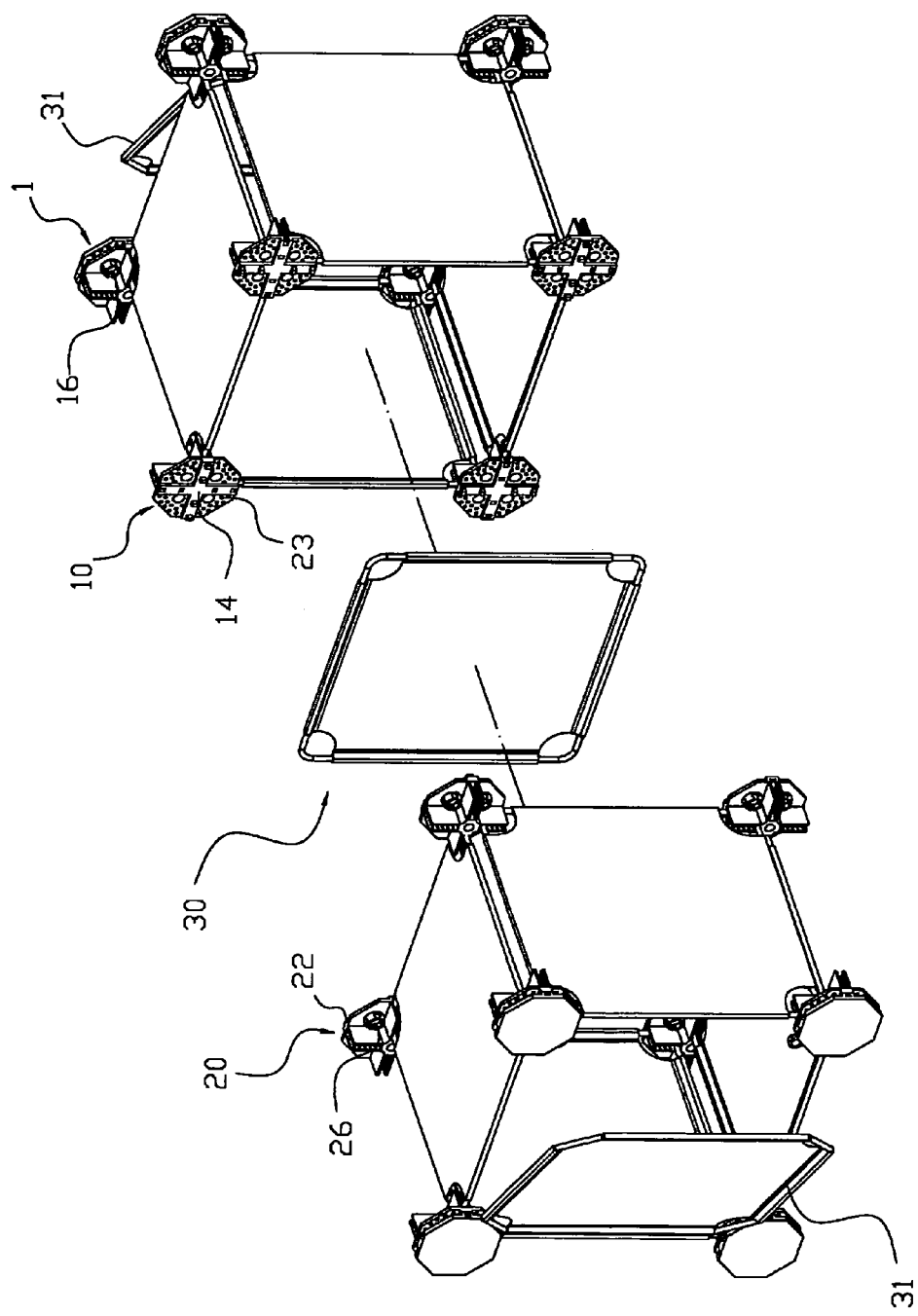
FIG. 15 illustrates an exploded view of the embodiment in FIG. 13 in the present invention.

Referring to FIG. 15, the second unit (20) having a plurality of rib units (25) engages with the connecting portion (14) of the first unit (10) through the engaging portion (22), and the resulting engaging slot (23) can be used to connect another board (30) to form a dividing board, and openings on both sides of the assembled structure can be used for doors (31) to form a double-sided structure. Also, the door (31) can be disposed and opened on both sides of the assembled structure.

Figure 16:
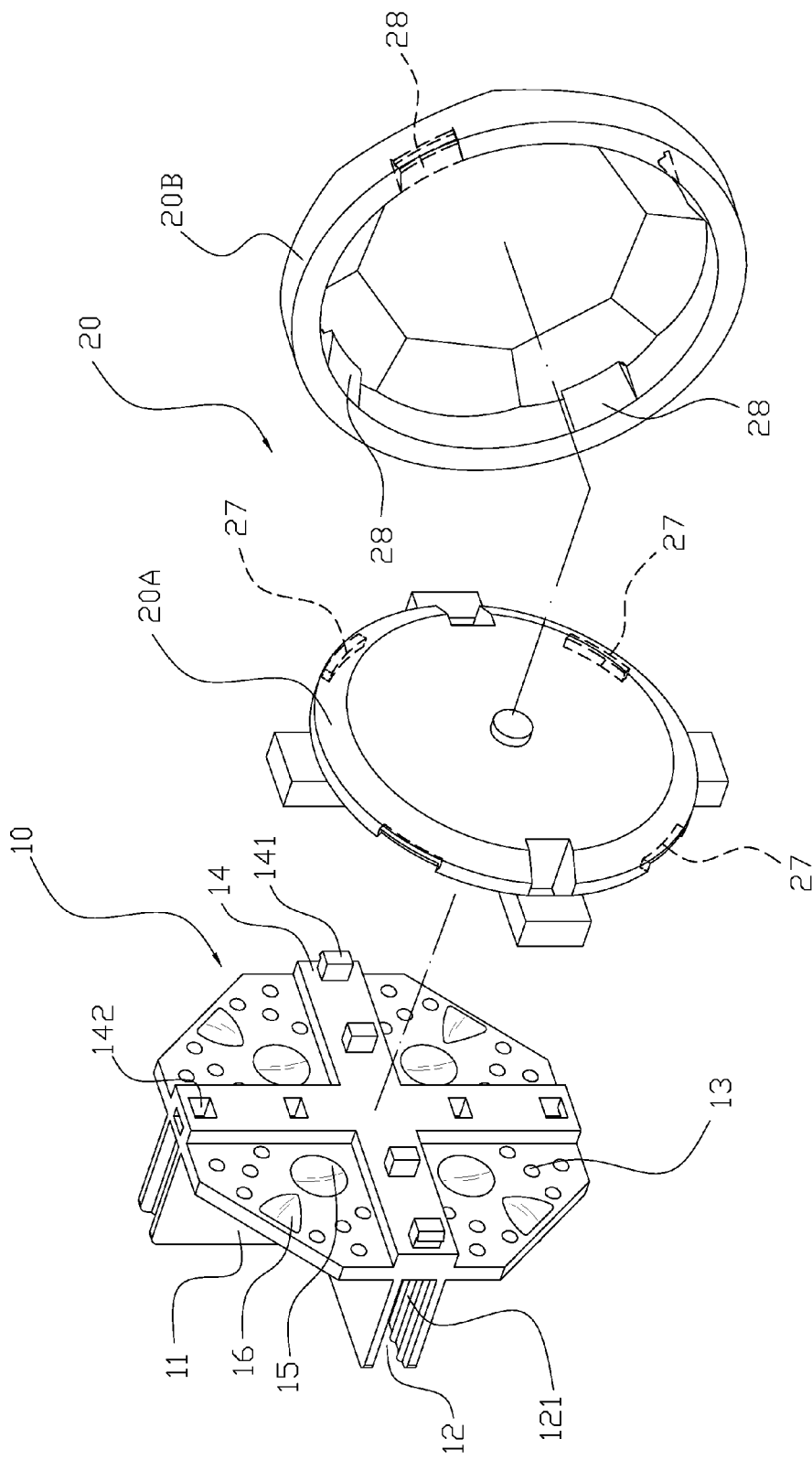
FIG. 16 illustrates a further embodiment in the present invention.
Figure 17:
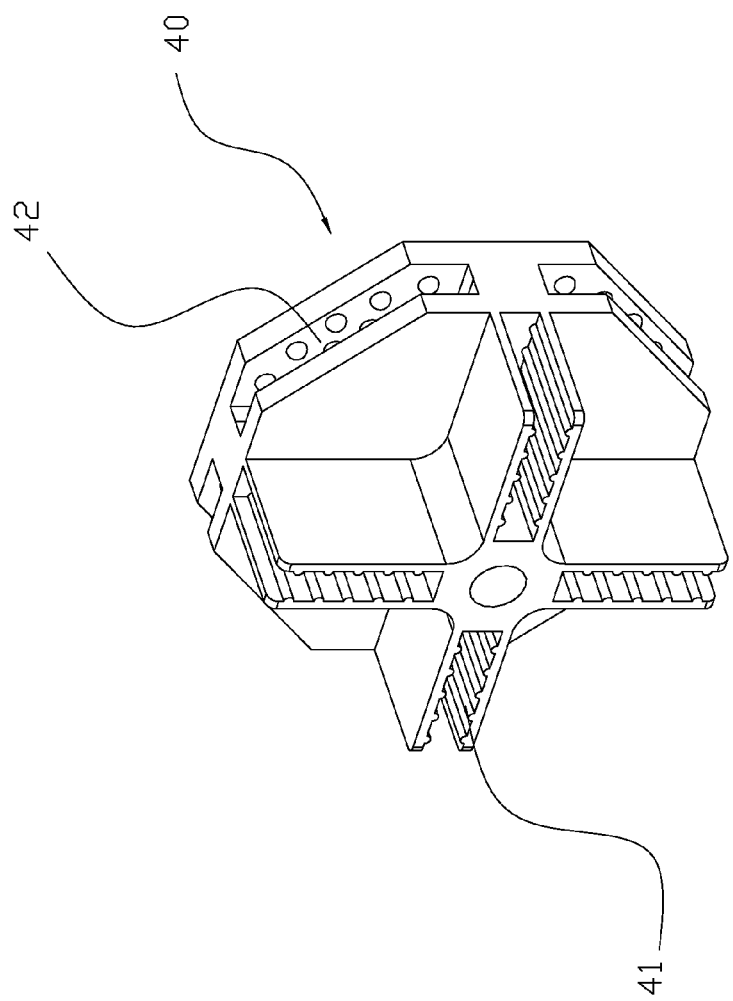
FIG. 17 illustrates a three-dimensional view of the prior art.

Furthermore, the second unit (20) is made of one piece as shown in FIGS. 1 to 15, or it includes a main body (20A) and a cover (20B) as can be seen in FIG. 16. A plurality of engaging grooves (27) are formed at the periphery of the main body (20A) to cover replaceable cover (20B). A plurality of hook ribs (28) are surrounded at the opening of the cover (20B), and the hook ribs (28) engage with the engaging ribs (27) of the main body (20A). The periphery of the cover (20B) can be of a polygon, for example, the shape of diamond, and words or patterns can be placed thereon. So, the user can change the words or patterns according to the user's preference on cover (20B) for the purposes of decoration and identification to increase the convenience when the structure in use.

According to the embodiments discussed above, the present invention is advantageous because the connector (1) is formed by the first unit (10) and second unit (20), and one side thereof is provided for board (30) to connect the long connecting slots (12) and define the engaging slot (23). The second unit (20) has varieties so that the configuration of the assembled structure (2) can be changed to increase the variety and practicability.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. An assembled structure comprising a connector having a first unit and a second unit, wherein a plurality of protruding ribs are protrudinlgly formed on a first surface of the first unit to define a plurality of horizontal and vertical long connecting slots; the first surface is divided into a plurality of partial surfaces by the protruding ribs, and a second surface of the first unit has a connecting portion with appropriate thickness protrudingly formed corresponding to the shape of the long connecting slots, wherein one side of the second unit has an engaging portion with predetermined thickness corresponding to the first unit to connect with the connecting portion of the first unit, and a plurality of engaging slots are formed between the first unit and second unit, wherein the connecting portion has a connecting block and a connecting hole, while the engaging portion of the second unit has an engaging block and an engaging hole, wherein a first engaging trough is recessedly formed near the connecting portion of the first unit, a second engaging trough is formed near the engaging portion of the second unit, a door is placed at the engaging slots between the first unit and the second unit, a protruding restriction arc is formed near the first engaging trough of the first unit, and a conjugating slot having a semi ball-shaped receiving space is protrudingly formed on each of said partial surfaces of the first unit, wherein four corners of the door form evading ends, and a connecting rod extends from one side of the door, and a head end is attached to the connecting rod, and when the first unit and the second unit of the connector connect with a board to form the assembled structure, one side of the assembled structure forms an opening for another door, so that the connecting rod extends to one side of the door and inserts into the engaging slot, and the head end is secured between the first engaging trough and the second engaging trough, wherein a slanted board with connecting sticks extending from four corners thereof is diagonally disposed inside the assembled structure, and one end of each of said connecting sticks has a ball-shaped connecting unit to be received in the semi ball-shaped receiving space of a corresponding conjugating slot to secure the slanted board.

2. The assembled structure of claim 1, wherein a plurality of second protruding ribs are protrudingly formed on the second surface of the first unit, and a plurality of engaging ribs are formed at an inner portion of the protruding ribs to engage with the long connecting slots, and a plurality of engaging points are formed on a lateral surface of the engaging portion of the second unit.

3. The assembled structure of claim 1, wherein the connecting portion and the engaging portion are engaged by magnetic force.

4. The assembled structure of claim 1, wherein the second unit includes a main body and a cover, and a plurality of engaging grooves are formed at a periphery of the main body to cover a replaceable cover, and a plurality of hook ribs are surrounded at an opening of the cover to engage with the engaging ribs of the main body.

5. An assembled structure comprising a connector having a first unit and a second unit, wherein a plurality of protruding ribs are protrudinlgly formed on a first surface of the first unit to define a plurality of horizontal and vertical long connecting slots; the first surface is divided into a plurality of partial surfaces by the protruding ribs, and a second surface of the first unit has a connecting portion with predetermined thickness protrudingly formed corresponding to the shape of the long connecting slots, wherein one side of the second unit has an engaging portion with predetermined thickness corresponding to the first unit to connect with the connecting portion of the first unit, and a plurality of engaging slots are formed between the first unit and second unit, and the other side of the second unit extends to form a plurality of rib units that define a plurality of elongated slots with vertical and horizontal directions, wherein the connecting portion has a connecting block and a connecting hole, while the engaging portion of the second unit has an engaging block and an engaging hole, wherein a first engaging trough is recessedly formed near the connecting portion of the first unit, a second engaging trough is formed near the engaging portion of the second unit, a door is placed at the engaging slots between the first unit and the second unit, a protruding restriction arc is formed near the first engaging trough of the first unit, and a conjugating slot having a semi ball-shaped receiving space is protrudingly formed on each of said partial surfaces of the first unit, wherein four corners of a door form evading ends, and a connecting rod extends from one side of the door, and a head end is attached to the connecting rod, and when the first unit and the second unit of the connector connect with a board to form the assembled structure, one side of the assembled structure forms an opening for another door, so that the connecting rod extends to one side of the door and inserts into the engaging slot, and the head end is secured between the first engaging trough and the second engaging trough, wherein a slanted board with connecting sticks extending from four corners thereof is diagonally disposed inside the assembled structure, and one end of each of said connecting sticks has a ball-shaped connecting unit to be received in the semi ball-shaped receiving space of a corresponding conjugating slot to secure the slanted board.

6. The assembled structure of claim 5, wherein a plurality of second protruding ribs are protrudingly formed on the second surface of the first unit, and a plurality of engaging ribs are formed at an inner portion of the protruding ribs to engage with the long connecting slots, and a plurality of engaging points are formed on a lateral surface of the engaging portion of the second unit.

7. The assembled structure of claim 5, wherein the connecting portion and the engaging portion are engaged by magnetic force.

8. The assembled structure of claim 5, wherein the second unit has an engaging trough near the rib units.

* * * * *